BAND EDGE OSCILLATION SUPPRESSION TECHNIQUES FOR HIGH FREQUENCY ELECTRON DISCHARGE DEVICES INCORPORATING SLOW WAVE CIRCUITS

Filed April 30, 1965 3 Sheets-Sheet 1

INVENTORS
WILLIAM L. BEAVER
THOMAS R. MULLEN
BY Wm J. Nolan
ATTORNEY

INVENTORS
WILLIAM L. BEAVER
THOMAS R. MULLEN
BY [signature]
ATTORNEY

BAND EDGE OSCILLATION SUPPRESSION TECHNIQUES FOR HIGH FREQUENCY ELECTRON DISCHARGE DEVICES INCORPORATING SLOW WAVE CIRCUITS

INVENTORS
WILLIAM L. BEAVER
THOMAS R. MULLEN
BY [signature]
ATTORNEY

United States Patent Office 3,397,33 Patented Aug. 13, 196

3,397,339

BAND EDGE OSCILLATION SUPPRESSION TECHNIQUES FOR HIGH FREQUENCY ELECTRON DISCHARGE DEVICES INCORPORATING SLOW WAVE CIRCUITS

William L. Beaver, Los Altos Hills, and Thomas R. Mullen, Sunnyvale, Calif., assignors to Varian Associates, Palo Alto, Calif., a corporation of California Filed Apr. 30, 1965, Ser. No. 452,279
15 Claims. (Cl. 315—3.5)

ABSTRACT OF THE DISCLOSURE

Band edge oscillations in a helical slow wave circuit may be suppressed by constructing the waveguide surrounding the helix in a manner such that the distance from the helix to the waveguide varies in an axial direction. For this purpose, the inside diameter of the waveguide may be tapered axially, or axial grooves may be cut in the interior of the waveguide, or metallic strips may be fastened to the interior wall of the waveguide. Each of these techniques causes the band edge frequencies of different portions of the helix to be nonidentical, substantially eliminating band edge oscillation. Alternatively, lossy attenuator strips may be distributed in the space between the helix and the waveguide in order to attenuate the magnetic fields which cause the oscillations.

Figure 1:
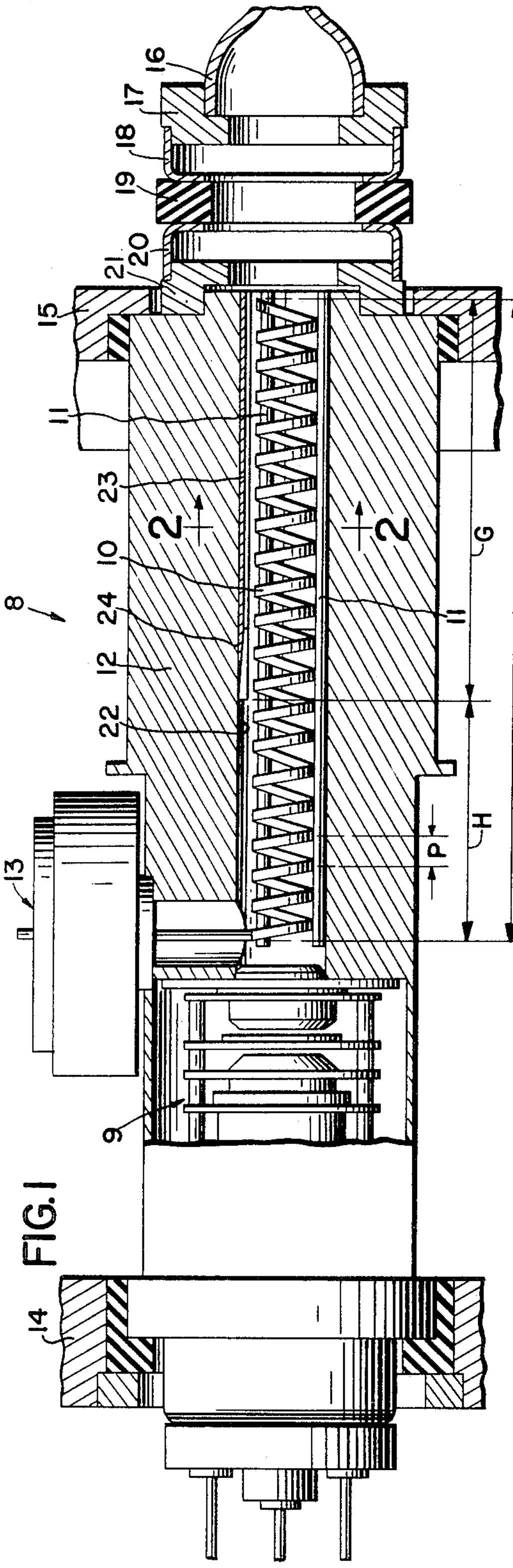

This invention relates in general to high frequency (e.g., microwave spectrum) electron discharge devices of the traveling wave, amplifier and oscillator types, and more particularly to such devices incorporating novel discriminatory band edge oscillation suppression techniques.

The theory and operation of high frequency electron discharge devices of the traveling wave type is well set forth in the prior art. See for example, J. R. Pierce, Traveling-Wave Tubes, D. Van Nostrand Co., New York, N.Y., 1950. An excellent discussion of traveling wave tubes of the backward wave oscillator type is set forth in the article entitled "Backward Wave Oscillators" by H. R. Johnson, Proceedings of the I.R.E., vol. 43, No. 6, June 1955. With the development of traveling wave tubes and the incorporation of same in systems wherein operating efficiency and stability are important parameters, tube designers are constantly seeking techniques for eliminating oscillation problems in traveling wave tubes both of the backward wave oscillator type and amplifier type as well as in hybrid types which incorporate a traveling wave section.

The present invention, through the utilization of novel discriminatory band edge oscillation suppression techniques, enables tube designers to design backward wave oscillator traveling wave tubes which are voltage tunable and which incorporate means for preventing band edge oscillations which means do not substantially perturb the intermediate regions of the passband of the device over the tunable operating range thereof and amplifier traveling wave tubes which incorporate band edge oscillation suppression techniques which do not substantially perturb the intermediate regions of the passband of the amplifier over the operating range thereof. The particular discriminatory band edge oscillation suppression techniques disclosed herein are advantageously incorporated in backward wave oscillator and amplifier types of traveling wave devices and are particularly advantageous from a construction standpoint due to their extreme simplicity of design. In essence, the particular band edge oscillation suppression techniques disclosed by the present invention involve discriminatory perturbation of the band edge portions of the operating passband while substantially nc perturbing the intermediate portion of the operating pas band of the particular traveling wave tube under consi eration.

The generic concept of the present invention can t broken down into the following specific approaches.

A preferred approach of discriminatory band edge osci lation suppression as taught by the present invention an applied to a microwave traveling wave device will includ a slow wave circuit defining a plurality of sections, eac of said sections having an axial extent encompassing plurality of periodic lengths of the slow wave circu with said sections having operating passbands inter-relate as follows:

(a) The upper band edge regions of the operatin passband of one of said plurality of sections being fr quency spaced with respect to the upper band edge r gions of the operating passband of another of said plı rality of sections.

(b) The operating passband of both said one and sai another sections over the desired operating frequenc range in the intermediate portion of the operating pas band being substantially identical.

The requirement for substantial identity between th aforementioned sections with regard to the intermediat portion of the operating passband is herein defined to ir clude slow-wave circuits incorporating standard velocit tapering techniques and slow-wave circuits which do nc incorporate efficiency improving velocity tapering tecl niques. In other words, another way of expressing th essence of the present invention with regard to both th broad generic concept as well as the specific embodimen is the incorporation of discriminatory band edge pertu bation means in a traveling wave device which do nc substantially perturb the intermediate or operating re gions of the operating passband of the device.

Another approach of discriminatory band edge osci lation suppression as taught by the present invention an applied to a high frequency traveling wave device ir volves a continuous variation of the band edge portion c the operating passband of the device over a plurality o periodic lengths of the slow wave circuit part of the de vice by means which do not substantially perturb th operating passband over the operating frequency range o the device.

The above approach can be specifically accomplishe by reactive perturbation techniques as specifically taugh hereinafter.

For example, the incorporation of conductive ridge or slots of a tapered or nontapered type which exten along the traveling wave device axis a plurality of pe riodic lengths, with or without impedance tapering fo suppression of regenerative oscillation effects occurring a the transition regions, is taught by the present inventior The incorporation of dielectric ridges or slots of a tapere or nontapered type which extend along the traveling wav axis a plurality of periodic lengths, with or without im pedance tapering for suppression of regenerative oscil lation effects due to the transition regions, is taught b the present invention.

Another specific approach taught by the present inven tion which falls within the generic concept involves th incorporation of lossy attenuation means which result i resistance loading at the band edge portions of the oper ating passband of the device without substantial perturba tion of the intermediate portion of the operating pass band of the device. The resistance loading approach wil also advantageously incorporate impedance tapering fo suppression of regenerative oscillation effects which migh otherwise occur due to abrupt impedance discontinuitie at the transition regions.

It is therefore an object of the present invention to provide a high frequency electron discharge device incorporating a slow wave interaction circuit with novel discriminatory band edge oscillation suppression means for the operating passband of the device.

A feature of the present invention is the provision of a high frequency electron discharge device incorporating a slow wave interaction circuit having a plurality of discrete reactive discontinuities extending along the active circuit length thereof, each of said plurality of discrete reactive discontinuities spanning a plurality of periodic lengths of said slow wave interaction circuit and adapted and arranged to provide frequency spaced band edge regions for the operating passband without substantial perturbation of the intermediate portion of the operating passband over the operating frequency range.

Another feature of the present invention is the incorporation in the aforementioned feature of tapered end transition portions for said reactive discontinuities thereby minimizing the power reflected from the transition regions of the discontinuities at any given frequency.

Another feature of the present invention is the provision of a high frequency electron discharge device incorporating a slow wave interaction circuit having means for introducing a continuous variation of the band edge portion of the operating passband of device over a plurality of periodic lengths which means does not substantially perturb the operating passband in the intermediate or operating regions of said operating passband.

Another feature of the present invention is the provision of a high frequency electron discharge device according to previous features wherein said band edge oscillation suppression means involves a discriminatory conductive perturbation mechanism or a discriminatory dielectric perturbation mechanism.

Another feature of the present invention is the provision of a high frequency electron discharge device incorporating a slow wave interaction circuit having lossy attenuator means which resistively load the band edge portion of the operating passband of the device without substantial perturbation of the operating passband over the operating frequency range in the intermediate regions of said operating passband of the device.

Another feature of the present invention is the provision of a high frequency traveling wave tube of the backward wave oscillator type incorporating a helix slow wave interaction circuit disposed within and spaced from a surrounding conductive waveguide, said conductive waveguide and helix slow wave interaction circuit including a plurality of discrete sections having lowest order operating passbands with frequency spaced band edges, each of said sections extending along a plurality of periodic lengths of said helix slow wave interaction circuit.

Another feature of the present invention is the provision of a high frequency traveling wave device incorporating a slow wave interaction circuit disposed within a conductive waveguide, said conductive waveguide having a plurality of elongated axially directed grooves or slots in the internal defining surface thereof, each of said grooves or slots extending over a plurality of periodic lengths of said slow wave interaction circuit, said grooves or slots functioning to increase the start oscillation current for band edge oscillations of said device at the upper band edge of the lowest order fundamental passband of the device.

Another feature of the present invention is the provision of a high frequency traveling wave device incorporating a slow wave interaction circuit disposed within a conductive waveguide, said conductive waveguide having a plurality of elongated ridge portions on the internal defining surface thereof, each of said ridge portions extending along a plurality of periodic lengths of said slow wave interaction circuit, said ridge portions functioning to increase the start oscillation current for band edge oscillations of said device at the upper band edge of the lowest order fundamental passband.

Another feature of the present invention is the provision of a high frequency electron discharge device of the backward wave oscillator type including a helix slow wave interaction circuit disposed within a conductive shell and supported therein by a plurality of dielectric rods disposed along the axial extent thereof and including a plurality of elongated metallic shim members disposed on the internal defining surface of the conductive shell and extending from the downstream end portion of said helix to approximately the center portion of said helix with the center end termination or transition portions of the shims beng impedance tapered, said shim members having azimuthal periodicity.

Other features and advantages of the present invention will become more apparent upon a perusal of the following specification taken in conjunction with the accompanying drawing wherein:

FIG. 1 is a longitudinal cross-sectional view partly in elevation of a high frequency traveling wave electron discharging device of the backward wave oscillator type incorporating the novel discriminatory band edge oscillation suppression means of the present invention.

Figures 2, 3, 4, 5:
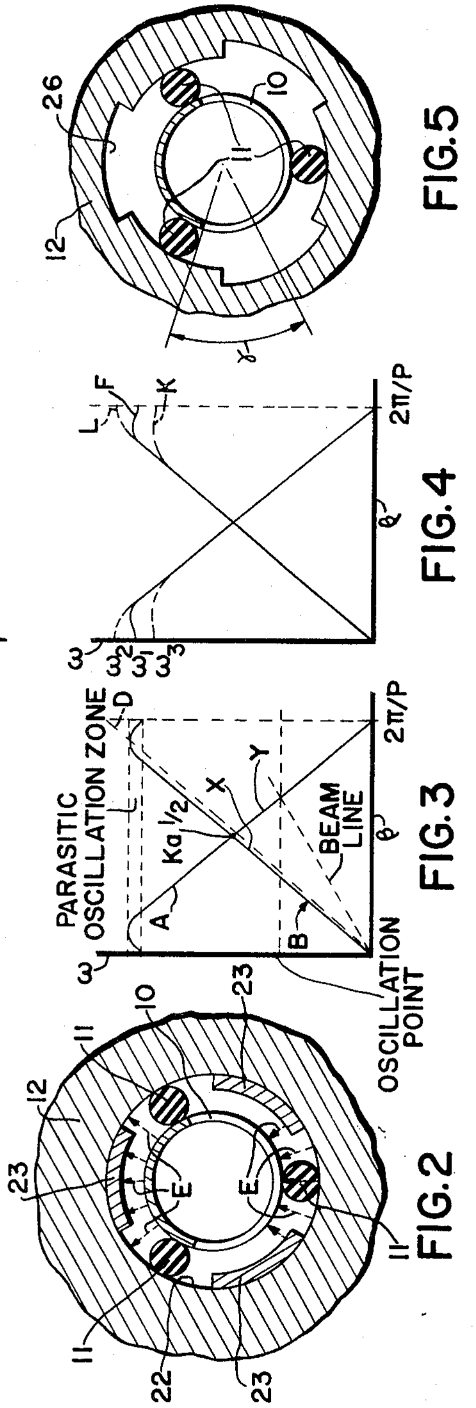

FIG. 2 is a cross-sectional view taken along the lines 2—2 of FIG. 1 depicting the supporting arrangement and band edge oscillation suppression means incorporated in the oscillator of FIG. 1, FIG. 3 is an illustrative $\omega-\beta$ diagram for the lowest order fundamental passband of a helix slow wave interaction circuit disposed within a conductive shell such as depicted in the embodiment of FIG. 1, FIG. 4 is an illustrative $\omega-\beta$ diagram depicting the effects of the incorporation of the novel discriminatory band edge oscillation suppression teachings of the present invention in a backward wave oscillator such as depicted in FIG. 1, FIG. 5 is a cross-sectional view of an alternative embodiment of a backward wave oscillator incorporating a groove or slot type of discriminatory band edge oscillation suppression technique disclosed by the present invention.

Figures 6, 7:
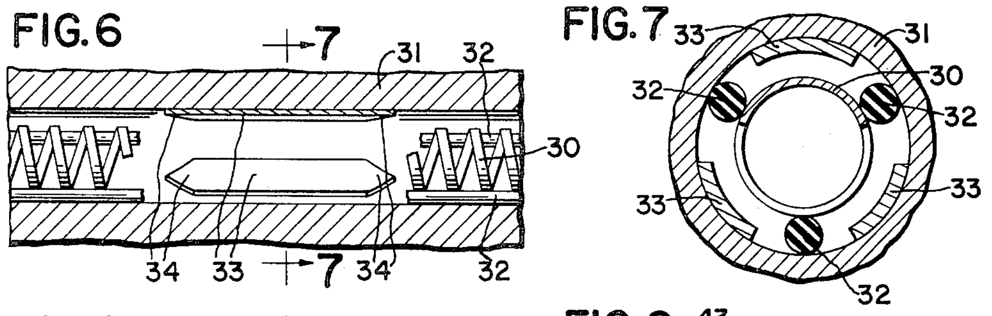
Figures 8, 9:
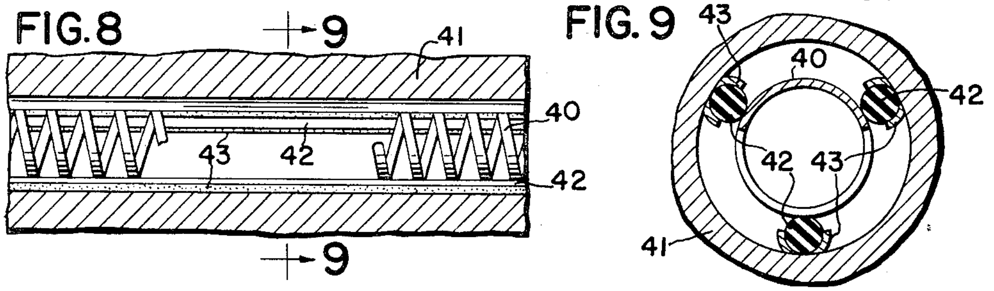
Figures 10, 11:
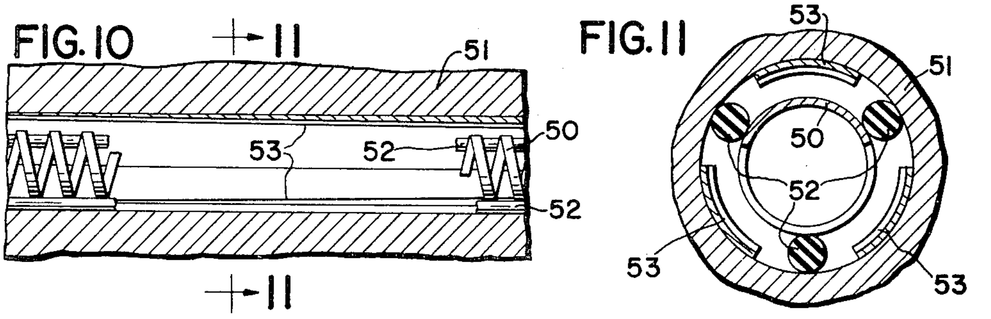
Figures 12, 13:
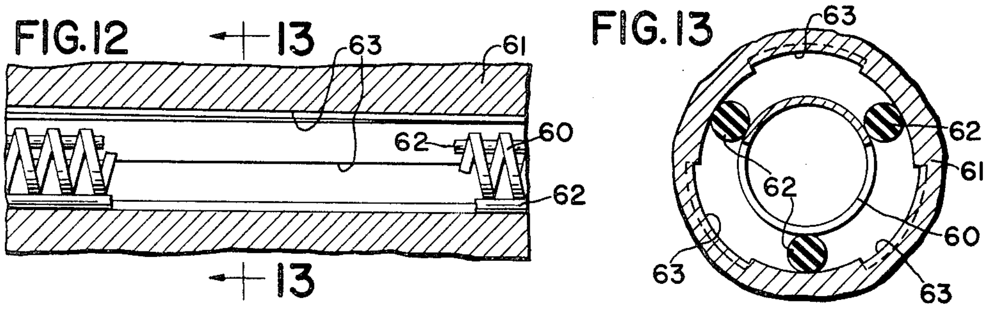
Figure 14:
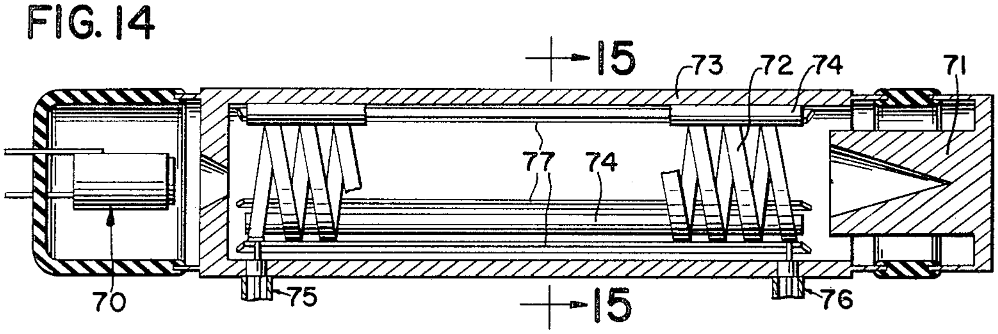

FIG. 6 is a fragmentary longitudinal cross-sectional view of a slow-wave circuit portion of a traveling wave electron discharge device such as the backward wave oscillator type depicted in FIG. 1 and incorporating band edge oscillation suppression means of the type depicted in FIG. 1 with a different type of impedance tapering, FIG. 7 is a cross-sectional view of the embodiment of FIG. 6 taken along the lines 7—7 in the direction of the arrows, FIG. 8 is a fragmentary longitudinal cross-sectional view of a slow-wave circuit portion of a traveling wave electron discharge device such as the backward wave oscillator type depicted in FIG. 1 and incorporating lossy attenuator discriminatory band edge oscillation suppression means, FIG. 9 is a cross-sectional view of the embodiment of FIG. 8 taken along the lines 9—9 in the direction of the arrows, FIG. 10 is a fragmentary longitudinal cross-sectional view of a slow-wave circuit portion of a traveling wave electron discharge device such as the backward wave oscillator type depicted in FIG. 1 and incorporating band edge oscillation suppression means which introduces a continuous variation of the band edge portion of the operating passband of the slow wave circuit, FIG. 11 is a cross-sectional view of the embodiment of FIG. 10 taken along the lines 11—11 in the direction of the arrows, FIG. 12 is another embodiment of the continuous variation type of band edge oscillation suppression means depicted in FIG. 10, FIG. 13 is a cross-sectional view of the embodiment of FIG. 12 taken along the lines 13—13 in the direction of the arrows, FIG. 14 is a longitudinal cross-sectional view partly in elevation of a high frequency traveling wave electron discharge device of the traveling wave amplifier type incorporating still another type of discriminatory band edge oscillation suppression means which involves a variation of the lossy attenuator means depicted in the embodiment of FIG. 8.

Figure 15:
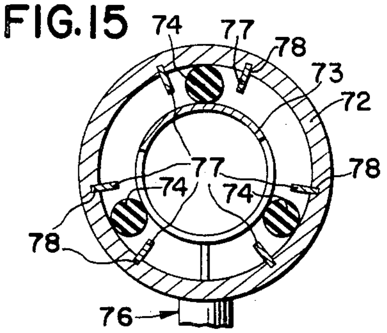
Figure 17:
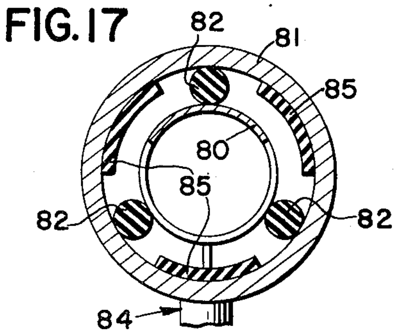
Figure 16:
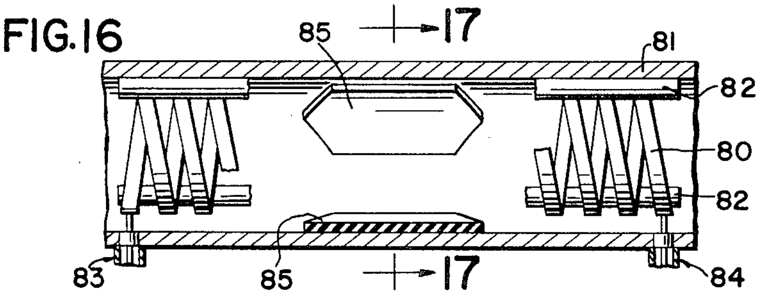
Figure 18:
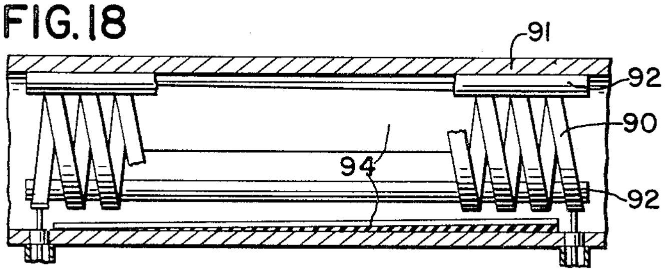

FIG. 15 is a cross-sectional view of the embodiment of FIG. 14 taken along the lines 15—15 in the direction of the arrows, FIG. 16 is a fragmentary longitudinal cross-sectional view of a slow-wave circuit portion of a traveling wave tube such as depicted in FIG. 14 incorporating discriminatory band edge oscillation suppression means of a dielectric loading type, FIG. 17 is a cross-sectional view of the embodiment of FIG. 16 taken along the lines 17—17 in the direction of the arrows, and FIG. 18 is a fragmentary longitudinal cross-sectional view of a slow-wave circuit portion of a traveling wave tube such as depicted in FIG. 14 incorporating a continuously tapered dielectric band edge oscillation suppression means.

Referring now to FIG. 1, there is depicted a high frequency electron discharge device of the backward wave oscillator type 8. Since the prior art is replete with theoretical and experimental studies of the operations of traveling wave electron discharge devices of the backward wave oscillator type, a comprehensive explanation will not be repeated herein. See for example the aforementioned H. R. Johnson article. The backward wave oscillator 8 depicted in FIG. 1 incorporates a suitable conventional electron gun or beam forming and projecting means 9 adapted and arranged to produce a hollow electron beam. See for example U.S. Patent No. 2,991,391 for the details of such a conventional hollow beam forming and projecting means 9. Disposed intermediate the downstream and upstream end portions of the backward wave oscillator 8 is a slow wave interaction circuit, helix 10, preferably of any suitable material such as, for example, molybdenum or tungsten, supported along the axial extent thereof by preferably three dielectric rods 11 made of such dielectric materials as, for example, sapphire. See FIG. 2 for more details. The helix 10 is preferably glazed to the sapphire rods and the resulting assembly is fixedly secured within the main body conductive shell or waveguide 12 of the backward wave oscillator 8. Thus the slow wave circuit of the oscillator depicted in the embodiment of FIG. 1 includes a slow wave interaction circuit, helix 10, supported within the shell 12 by means of rods 11. A suitable coaxial output arrangement 13 is connected at the upstream end portion of the helix for extracting electromagnetic wave energy generated by the oscillator 8.

Any suitable magnetic focusing scheme such as, for example, that disclosed in U.S. Patent 3,387,167 issued June 4, 1968, by Richard H. Ohtomo or such as that disclosed in U.S. Patent 2,991,391, by W. L. Beaver, both of which are assigned to the same assignee as the present invention, may be utilized to provide a suitable magnetic field intensity between the upstream and downstream portions of the oscillator 8 in order to obtain suitable focusing along the axial extent of the slow wave interaction circuit helix 10. Since the particular focusing scheme utilized in the present invention to provide suitable focusing along the axial extent of the helix does not form part of the present invention only fragmentary portions of same are shown, such as pole caps 14, 15. The downstream end portion of the backward wave oscillator is vacuum sealed by means of a copper tubulation 16 which is supported and vacuum sealed such as by brazing to a steel support ring 17 which in turn is supported on a Kovar or the like cup-shaped support member 18. The aforementioned elements are supported in D.C. isolation with respect to the tube main body by means of a ceramic insulation ring 19 which is sandwiched between the cup-shaped support ring 18 and another matching cup-shaped support ring 20 and vacuum sealed thereto such as by brazing. A steel or the like support ring member 21 is vacuum sealed to the tube main body as shown and serves to support the aforementioned assembly in a vacuum sealed relationship with respect to the main body 12.

The backward wave oscillator 8 depicted in FIGS. 1 and 2 incorporates a preferred embodiment of the novel discriminatory band edge oscillation suppression techniques taught by the present invention. The physical form of the preferred embodiment of the band edge oscillation suppression means depicted in FIG. 1 are three elongated arcuately shaped, metallic, electrically conductive, shims 23 which are disposed at 120° space rotated or azimuthal displaced positions about the helix slow wave interaction circuit and brazed or the like to the internal conductive guide wall surface or bore 22 of the conductive shell as shown in FIGS. 1 and 2. The shims or ridges 23 are disposed as shown at the downstream end portion of the oscillator and extend along preferably half the active circuit length and the end portions or transition region 24 are preferably tapered in order to minimize electromagnetic wave energy power reflections from the transition region between the circuit section having the reactive loading shims and the circuit section at the upstream portion which does not have the reactive loading ridges. It can be appreciated that the presence of the tapered transition between the two regions would minimize electromagnetic wave energy power reflections at any given frequency and eliminate excessive fluctuations in the power output and the tuning characteristics which are associated with abrupt discontinuities.

Three shim members or loading ridges 23 were utilized in the backward wave oscillator depicted in FIGS. 1 and 2 for purposes of symmetry. However, it is to be understood that any number of elongated axially directed loading ridges may be employed within the teachings of the present invention so long as a symmetrical distribution (azimuthal periodicity) is maintained in order to prevent the introduction of undesirable stop bands within the operating passband. For example, the main body or conductive shell 12 could be formed with a stepped central bore to thereby define two discrete portions or sections having different internal diameters each section of which extends over approximately half an active circuit length of the helix such as shown in the preferred embodiment of FIG. 1 and accomplish somewhat similar results. Once again, the present invention would teach incorporating a tapered transition between the two sections in order to prevent reflection oscillations. A periodic length in the case of a helix slow wave interaction circuit is indicated in FIG. 1 by P which is equal to the pitch or one turn of the helix. The band edge oscillation suppression techniques of the present invention can take the form of ridges such as utilized in FIGS. 1 and 2 or the slotted or grooved technique depicted in FIG. 5 and each section spans a plurality of periodic lengths of the slow wave interaction circuit under consideration.

With regard to the aforementioned symmetry considerations with respect to a discriminatory band edge oscillation suppression means of the type shown in the embodiments of e.g., FIGS. 2 and 5 it is important to maintain equal azimuthal spacing between the grooves or ridges in order to prevent the introduction of a stop band within the operating pass band. Such a stop band would obviously result in a substantial perturbation of the intermediate portion of the passband. For example, if a single groove or ridge of the type shown in the embodiments of e.g. FIGS. 2 and 5 were employed, an unsymmetrical distribution would exist and a stop band at $Ka=\frac{1}{2}$ could result. Similarly, if two or more ridges or grooves are employed, it is important to maintain equal azimuthal spacing, azimuthal periodicity, between the ridges or grooves in order to prevent the introduction of a perturbation in the operating passband such as, e.g., a stop band at $Ka=\frac{1}{2}$.

Thus, if two ridges or grooves are used for band edge oscillation suppression, 180° azimuthal spacing or periodicity should be maintained; if three ridges or grooves are used for band edge oscillation suppression then 120° azimuthal spacing should be maintained, etc. In FIG. 5 an azimuthal angle labeled $\alpha$ is shown for purposes of illustration.

Quite obviously the greater the azimuthal span of each ridge or groove the greater the effective change on the internal shell diameter and the resultant greater shift in the band edge region of the passband with respect to the band edge region of a nonperturbed axially displaced section such as, e.g., the nonperturbed or smooth bore portion at the upstream end of the oscillator of FIG. 1.

As is well known in the art, a backward wave oscillator is a voltage tunable device which is capable of oscillation over a fairly wide frequency band as indicated in the illustrative $\omega-\beta$ diagram of FIG. 3. The $\omega-\beta$ diagram of FIG. 3 depicts a typical lowest order fundamental passband characteristic for a helix slow wave interaction circuit disposed within a conductive shell and spaced therefrom by means of dielectric rods such as depicted in FIG. 1. The backward wave oscillator, as is well known in the art, operates on a backward wave space harmonic which is indicated by curve A to be the fundamental backward wave space harmonic branch and the tuning mechanism which enables the backward wave oscillator to have a wide operating bandwidth involves simply varying the beam velocity indicated by the dotted line labeled beam line between, for example, points X and Y. As the beam voltage is increased from Y to X the frequency of oscillation increases correspondingly as indicated in the $\omega-\beta$ diagram. No problems of any significant degree with regard to the fundamental forward wave space harmonic, curve labeled B, are encountered until the beam voltage approaches at point labeled X which is equivalent to a point labeled $Ka=\frac{1}{2}$ where the fundamental backward wave space harmonic branch intersects with the fundamental forward wave space harmonic branch.

$Ka$ is a normalized parameter proportional to frequency and numerically equal to the number of wave lengths per helix turn where $$K=\frac{2\pi f}{C}$$

and $$Ka=\frac{2\pi fa}{C}$$

where
$f$=frequency
$a$=average circuit radius
$C$=velocity of light

As this point of intersection is approached it is seen upon examination of an extended beam line labeled D that the beam velocity will intersect the upper band edge regions of the forward wave fundamental space harmonic branch at the band edge portion labeled parasitic oscillation zone. Circuit impedance at this band edge is very high and the start oscillation current at the band edge has been determined through theoretical and experimental analysis to be low even though the coupling between the beam and the circuit is low at the band edge or parasitic oscillation zone region and at times the start oscillation current for band edge oscillations is lower than that required for the desired operating mode on the backward wave space harmonic branch which of course means that band edge oscillations would occur depending upon the active circuit length. This of course results in undesired breaks in the tuning curve of the oscillator since the parasitic or band edge oscillation takes over and prevents oscillation in the desired backward wave space harmonic mode.

Theoretical and experimental analysis has shown that the band edge region is primarily a function of the helix and outer shell physical dimensions and that the electric field is predominantly radial therebetween at the band edge regions of the operating passband. The particular shape of the $\omega-\beta$ characteristics of both the forward and backward fundamental space harmonics in their tunable or operating region between X and Y for example has been determined to be relatively insensitive to the spacing of the surrounding guide or shell 12 from the helix itself. This then leads one to the conclusion that reactive perturbation of the shell dimensions over a plurality of periodic lengths of the circuit would result in perturbation of the band edge regions of the operating passband, but would not substantially perturb the intermediate portions of the operating passband since the field configuration and the intensity distribution between the helix and the surrounding guide wall differs between these two regions. Therefore the present invention in the embodiment of FIG. 1 teaches band edge oscillations may be effectively suppressed in traveling wave tubes by creating a plurality of reactive discontinuities along the active circuit length of the slow wave circuit such that each of the sections has frequency spaced band edges for the operating passband and which band edge oscillation suppression means do not substantially perturb the operating portion of the passband. In each case standard perturbation measurement techniques may be utilized to determine the precise dimensions involved.

Common to each of the band edge oscillation suppression means taught by the present invention in the embodiments of FIGS. 1–18 is the physical spacing of the oscillation suppression means from the interaction regions of the slow wave interaction circuit such as those regions in the vicinity of the helical gaps between axially opposed edge portions of adjacent turns where the axial electric fields associated with electromagnetic energy within the operating region are strongest. Furthermore, the non-resonant characteristics of each of the discriminatory band edge oscillation suppression means of the present invention are highly advantageous from a constructional viewpoint disregarding the novel phenomenological aspects of the non-resonant distributed type of discriminatory band edge oscillation suppression taught herein.

Turning now to FIG. 4 application of the above discussed discriminatory band edge oscillation suppression techniques as applied to the backward wave oscillator depicted in FIG. 1 results in three distinct band edges depending upon whether the band edge oscillation suppression techniques are employed or not employed. The upper band edge for a helix disposed within a conductive shell without any reactive perturbations such as the metallic shims 23 utilized in FIG. 1 would have a band edge frequency corresponding to $\omega_1$ as indicated in FIG. 4, curve labeled F. A reactive perturbation spanning a plurality of periodic lengths such as half the active circuit length, section labeled G in FIG. 1, will change the upper band edge frequency e.g. to that labeled $\omega_2$ curve labeled L, whereas the non-perturbed section labeled H would retain the $\omega_1$ band edge frequency. If, instead of ridges such as achieved through the utilization of the conductive shims 23, grooves or slots were cut in the surrounding shell 12, such as indicated in the embodiment of FIG. 5 wherein a plurality of 120° space rotated groove portions 26 are cut into the surrounding shell, then the upper band edge frequency for the grooved portion would correspond to $\omega_3$ curve labeled K, of the $\omega-\beta$ characteristics of FIG. 4. The non-grooved portion would retain the $\omega_1$ band edge frequency. In either case the electron beam would see two distinct band edge frequencies over the active circuit length F and could not simultaneously maintain synchronism continuously at both of these frequency spaced band edges. Therefore the starting current for band edge oscillations would be considerably raised. The application of such a reactive perturbation of the surrounding conductive shell over a plurality of periodic lengths results in a tunable backward wave oscillator easily tunable within the approaches of the $Ka=\frac{1}{2}$ region or the intersection of the backward and forward fundamental space harmonics without the introduction of a stop band or band edge oscillations or drop-out of the chosen mode of oscillation.

Although the band edge oscillation suppression techniques depicted in FIGS. 1 and 5 were described with regard to an embodiment which incorporates just two sections having distinct band edge frequencies which are separated from each other it is readily apparent that more than two such differential sections having spaced band edge frequencies may be incorporated in traveling wave tubes of both the amplifier and backward wave oscillator type. In each instance it is preferable that the transition regions between the sections be tapered in order to minimize electromagnetic power reflections at any one given frequency therebetween in order to minimize regenerative oscillation problems. In each instance the teachings of the present invention as embodied in FIGS. 1–5 would involve spanning a plurality of periodic lengths of the total active circuit length for any given differential section.

Since the discrete reactive perturbation band edge oscillation suppression technique of the present invention is discriminatory and does not appreciably perturb the intermediate or operating regions of the lowest order fundamental passband of the slow wave circuit while appreciably perturbing the band edge regions of the lowest order fundamental passband it is an extremely useful tool for the tube designer and is easily applicable to both forward wave amplifiers and backward wave oscillators of the traveling wave type.

Turning now to FIGS. 6 and 7 there is depicted a variation of the band edge oscillation suppression mechanism utilized in the traveling wave tube depicted in FIG. 1. A helix slow wave interaction circuit 30 is disposed within a conductive cylinder 31 and supported therein by means of a plurality of dielectric rods 32 in the same manner as depicted in the embodiment of FIG. 1. Since the particular details of the traveling wave tube have already been exemplified in FIG. 1, only a fragmentary portion of same is depicted in FIG. 6. The particular band edge oscillation suppression mechanism utilized in the embodiment of FIG. 6 in order to discriminately perturb the band edge portions of the operating passband of the embodiment of FIG. 6 deviates from that shown in FIG. 1 in the following manner. In order to prevent or minimize the danger of regenerative oscillations occurring due to abrupt discontinuities between the conductive shims 33 and the normal or non-perturbed portion of the conductive surrounding waveguide or cylinder 31, the transition regions are tapered in a circumferential or azimuthal direction rather than in a radial manner as in the embodiment of FIG. 1. The resultant impedance tapering effects are equivalent to those achieved in the radial tapering embodiment depicted in FIG. 1. Furthermore, in the variation of FIG. 6, the discrete reactive perturbations 33 are disposed at the center portion of the active circuit length of the helix 30 and again span a plurality of periodic lengths of the helix 30. The introduction of the discrete reactve perturbations 33 in the embodiment of FIG. 6 functions in the same manner as taught in conjunction with the band edge oscillation suppression mechanism utilized in the embodiment of FIG. 1. In other words, the operating passband for the slow wave circuit will have distinct frequency space band edge portions along different axially spaced portions of an active circuit length of the slow wave circuit.

In FIGS. 8 and 9 another embodiment of the novel discriminatory band edge oscillation suppression techniques of the present invention is depicted and embodied in a fragmentary portion of a traveling wave tube such as shown in FIG. 1. A helix slow wave interaction circuit 40 is disposed within a conductive waveguide or shell 44 and supported therein by means of a plurality of dielectric rods 42 as previously described. The band edge oscillation suppression mechanism utilized in the embodiment of FIG. 8 involves a relative or discriminatory positioning of lossy attenuator materials such as carbon-loaded ceramic or any other conventional high frequency lossy attenuator material. The specific embodiment of FIG. 8 incorporates a plurality of elongated arcuately shaped lossy strips 43 bonded to a portion of the external peripheral surface of each of the dielectric rods as shown best in FIG. 9. The lossy arcuate shaped attenuator strips extend along the axial extent of the slow wave interaction circuit 40 and are characterized by being spaced from the external circumferential surface of the slow wave interaction circuit helix along the axial extent thereof. In other words the band edge oscillation suppression means in each embodiment, FIGS. 1–18, is spaced from the strong axial electric field region of interaction. The particular lossy arcuate shaped attenuator strips 43 are characterized by having greater radial dimensions than circumferential of azimuthal thickness dimensions as shown. This particular physical relationship and physical dimensioning of the lossy attenuator strips 43 results in a discriminatory attenuation effect with regard to the operating passband of the slow wave circuit.

At the upper band edge portion of the operating passband for the slow wave circuit depicted herein, the electric fields are primarily radial as shown by the E-fields in FIGS. 8 and 9 and the axially directed E-field components of the electromagnetic wave energy at the upper band edge portion fall off exponentially between the helix external periphery and the internal surface of the surrounding wave guide shell 41. The radial components of the E-fields do not undergo an exponential decrease and are proportionately greater in intensity in relation to the axial E-field components in the band edge regions. The physical displacement of the lossy arcuately shaped attenuator strips 43 as depicted in the embodiment of FIG. 8 coupled with their greater radial dimensions in relation to their circumferential dimensions results in absorption of electromagnetic energy and considerable loss being introduced in the upper band edge region in comparison to the intermediate or operating regions of the operating passband. This can be understood by realizing that in the operating or intermediate regions of the operating passband the electric field between the external peripheral portion of the helical slow wave interaction circuit and the internal conductive surface of the surrounding shell or waveguide 41 are primarily axially directed and fall off exponentially between the helix and surrounding shell and little if any radial electric field components exist. Thus, the lossy attenuator band edge oscillation suppression mechanism depicted in the embodiment of FIGS. 8 and 9 falls within the generic concept of discriminatory band edge oscillation suppression as taught by the present invention.

In FIGS. 10 and 11 another fragmentary portion of the traveling wave tube depicted in FIG. 1 is depicted wherein a helix slow wave interaction circuit 50 is disposed in a conductive waveguide or shell 51 and supported therein by means of a plurality of dielectric rods 52 as in the previous embodiments. The particular band edge oscillation suppression mechanism utilized in the embodiment of FIG. 10 involves a continuous variation of the upper band edge portion of the operating passband of the slow wave circuit through a tapered reactive mechanism. In the specific embodiment of FIG. 10 a plurality of elongated conductive shim members 53 which have continuously variable radial tapers along the axial extent of the slow wave interaction circuit are employed. The particular conductive shim members 53 can extend from one end of an active circuit portion of the slow wave circuit to the other end, or in other words, between any two severed regions they may be continuous or in a nonsevered tube such as depicted in FIG. 1, a backward wave oscillator type of tube, they would simply be inserted between the gun end and the downstream end regions of the slow wave circuit. The continuous taper type of discriminatory band edge oscillation suppression technique depicted in the embodiment of FIG. 10 would advantageously employ impedance tapered transition regions in order to eliminate any abrupt impedance discontinuities in order to prevent regenerative oscillation effects.

The particular mechanism involved in the embodiment of FIG. 10 with regard to increasing the start oscillation current for band edge oscillations without appreciably perturbing the intermediate or operating region of the operating passband is similar to the discrete reactive perturbations previously described in connection with FIGS. 1 through 7. Frequency spaced band edge portions are created by the presence of the reactive shim members 53. However, instead of having distinct axially spaced regions having frequency spaced band edge regions, a multiplicity of such regions might be said to exist in a continuously tapered version such as depicted in FIG. 10. The effect, however, is substantially the same and greatly increased start oscillation currents are caused with regard to the band edge portion of the operating passband without any appreciable perturbation of the intermediate or operating regions of the fundamental passband. In the case of a backward wave oscillator, the fundamental backward wave space harmonic branch, labeled A, in the $\omega-\beta$ diagram of FIG. 3, and in the case of a forward wave amplifier the fundamental forward wave space harmonic branch, labeled $\beta$, in the $\omega-\beta$ diagram in FIG. 3, would be the conventional operating modes. The rational with regard to the intensity relationships of the electric field components of the electromagnetic traveling wave between the helix and the surrounding shell with regard to both intermediate portions of the operating passband and the upper band edge regions is equally advantageously applied to the continuous variation band edge oscillation suppression mechanism of FIG. 10 in order to achieve an understanding of the operation thereof.

In the embodiments of FIGS. 12 and 13, a fragmentary portion of a traveling wave tube such as depicted in FIG. 1 is once again shown wherein a helix slow wave interaction circuit 60 is disposed in a conductive shell or waveguide 61 and supported therein by a plurality of dielectric rods 62. Once again, a continuous variation of the band edge portion of the operating passband such as that described previously in connection with FIG. 10 is employed. The distinction between the embodiments of FIGS. 10 and 12 involves the use of slots or grooves in the embodiment of FIG. 12 in comparison to the ridged or shim technique of FIG. 10. In operation, the approaches are similar. Once again, the same considerations regarding impedance tapered transition regions in order to minimize danger of regenerative oscillation due to abrupt impedance discontinuities are advantageously incorporated in the embodiment of FIG. 12 with regard to the slotted regions 63.

In the embodiment of FIG. 14 a traveling wave tube electron discharge device of the forward wave amplifier type is depicted incorporating a conventional beam forming and projecting means 70 disposed at the upstream end portion thereof, and a collector 71 disposed at the downstream end portion thereof. Intermediate the upstream and downstream portions a helix slow wave interaction circuit 72 is disposed within a conductive shell or waveguide 73 and supported therein by a plurality of dielectric rods 74. Any suitable electromagnetic coupling arrangements such as coaxial coupler means 75 is connected at the upstream end portion of the device for the introduction of electromagnetic traveling wave energy within the operating passband of the device for amplification thereof. At the downstream end portion of the slow wave interaction circuit 72 a similar coaxial output coupler means 76 is connected to the downstream portion of the helix in order to extract amplified electromagnetic energy in a conventional manner.

The particular band edge oscillation suppression mechanism utilized in the embodiment of FIG. 14 is shown best in FIG. 15 and involves a variation of the lossy attenuator approach as previously discussed in connection with the embodiment of FIG. 8. As shown in FIG. 15, a plurality of axially elongated lossy attenuator strips 77 are disposed along the axial extent of the slow wave interaction circuit, helix 72, and spaced therefrom. The strips 77 have greater radial dimensions than circumferential dimensions in order to provide proportionately greater loss to the electric field between the helix outer periphery and the internal defining surface of the conductive shell 73 at the band edge regions than at the intermediate or operating portion of the passband as described previously in conjunction with the embodiment of FIG. 8. The lossy attenuator strips 77 as shown in the embodiments of FIGS. 14 and 15, are simply radially disposed in a plurality of axially elongated slots 78 cut in the internal defining surface of the shell. The strips are bonded therein and fixedly secured thereby by any conventional bonding techniques.

In FIGS. 16 and 17, a fragmentary portion of the traveling wave tube of the type shown in FIG. 14 is depicted wherein a helix slow wave interaction circuit 80 is disposed in a conductive shell 81 and supported therein by a plurality of dielectric rods 82. Input and output R.F. coupling means 83, 84 as in the amplifier embodiment of FIG. 14 are utilized. The particular band edge oscillation suppression mechanism utilized in the embodiment of FIG. 16 involves a dielectric perturbation mechanism exemplified by the dielectric members 85 which are disposed on the internal defining surface of the conductive shell and span a plurality of periodic lengths of the slow wave interaction circuit.

The band edge oscillation suppression mechanism utilized in the embodiment of FIGS. 16 and 17 can be termed a dielectric perturbation mechanism wherein the velocity of the electromagnetic traveling wave energy associated with the upper portion or band edge portion of the fundamental operating passband is perturbed within the dielectric region bounded by dielectric members 85 in comparison to the velocity associated with the nonperturbed regions axially displaced therefrom. This results in the same type of frequency spaced band edge regions associated with the conductive perturbation technique disclosed in conjunction with the embodiments of FIGS. 1, 2, and 7. The transition regions 86 of the discrete dielectric perturbation members 85 utilized in the embodiment of FIG. 16 are tapered in much the same fashion as shown in connection with the embodiment of FIG. 6 in order to eliminate any regenerative effects due to abrupt impedance discontinuities introduced by the discriminatory band edge oscillation suppression means.

In FIG. 18 a dielectric band edge oscillation suppression mechanism of the continuously variable type is depiceted in conjunction with a fragmentary view of a traveling wave tube suche as depicted in FIG. 14. Once again, a helix slow wave interaction circuit 90 is disposed within a conductive waveguide or shell 91 and supported therein by a plurality of dielectric rods 92. The continuously variable dielectric band edge perturbation or oscillation suppression mechanism depicted in FIG. 18 involves the positioning of dielectric members 94 having continuously tapered radial dimensions along the axial extent of the slow wave circuit. Quite obviously the continuously variable dielectric perturbation technique disclosed in the embodiment of FIG. 18 can span any selected plurality of periodic lengths of the slow wave interaction circuit and does not necessarily have to extend along the entire axial extent of the slow wave interaction circuit. Once again the transition regions, if abrupt, are advantageously impedance tapered in order to eliminate any regenerative oscillation problems as previously discussed. As mentioned previously, the dielectric members have azimuthal periodicity, in other words equal azimuthal spacing therebetween, in order to minimize any possibility of introducing a stop band in the intermediate regions of the operating passband at $Ka=\frac{1}{2}$. Similarly, the dielectric members are physically spaced from the external peripheral surface of the helix, or interaction regions of strong axial electric fields, in order to prevent perturbation of the intermediate regions of the operating passband.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A high frequency electron discharge device having an elongated axis along which an electron beam travels in energy exchange relationship with an electromagnetic traveling wave over at least a portion of the axial extent of said device, said device including a beam forming and projecting means disposed at the upstream portion of said device and a slow wave interaction circuit disposed along the device axis downstream from said electron beam forming and projecting means, said device including means for suppressing band edge oscillations of said device, said means for suppressing band edge oscillations comprising a plurality of axially elongated conductive loading ridge portions spanning a plurality of periodic lengths of said slow wave interaction circuit along the axial extent thereof and inter-related with said slow wave interaction circuit such as to introduce a frequency spaced band edge region in the operating passband over said plurality of periodic lengths with respect to a non-perturbed region axially spaced from said perturbed region without substantially perturbing the intermediate region of said operating passband.

2. A microwave electron discharge device having an elongated axis along which an electron beam travels in energy exchange relationship with an electromagnetic traveling wave over at least a portion of the axial extent of said device, said device including a beam forming and projecting means disposed at the upstream portion of said device and a slow wave interaction circuit disposed along the device axis downstream from said electron beam forming and projecting means, said slow wave interaction circuit comprising a helix disposed within and spaced from a conductive shell, said device including means for suppressing band edge oscillations in said device, said means for suppressing band edge oscillations including a non-resonant reactive perturbation means spanning a plurality of periodic lengths of said slow wave interaction circuit, said non-resonant reactive perturbation means includes means forming a plurality of axially elongated transverse discontinuities of the internal defining surface of said conductive shell disposed about said helix, said discontinuities spanning said plurality of periodic lengths of said slow wave interaction circuit.

3. A device defined in claim 2 wherein said means forming said plurality of axially elongated transverse discontinuities includes a plurality of azimuthally displaced axially elongated conductive ridges disposed on the internal defining surface of said shell and radially spaced from said helix.

4. The device defined in claim 2 wherein said means forming said plurality of axially elongated transverse discontinuities includes a plurality of azimuthally displaced axially elongated slots in the internal defining surface of said shell and radially spaced from said helix.

5. The device defined in claim 2 wherein the transition region between said means forming said plurality of axially elongated transverse discontinuities and said non-perturbed internal defining surface of said conductive shell are tapered along the axial extent of said slow wave interaction circuit in order to minimize regenerative oscillation effects in said device.

6. A microwave backward wave oscillator of the traveling wave type having an elongated axis along which an electron beam travels in energy exchange relationship with an electromagnetic traveling wave along the axial extent of said device, said backward wave oscillator including a beam forming and projecting means disposed at the upstream end portion of said device and a slow wave circuit disposed along the device axis downstream from said electron beam forming and projecting means, and slow wave circuit including a helix coaxially disposed about said elongated axis and a conductive shell coaxially disposed about said elongated axis and about said helix and spaced from said helix, said helix being supported within said conductive shell by a plurality of azimuthally space-rotated axially elongated dielectric rods having azimuthal periodicity, said device including means for increasing the start oscillation current for band edge oscillations at the upper band edge of the forward wave fundamental space harmonic branch of the operating passband of said slow wave circuit, said means including a plurality of elongated shims made of conductive material disposed intermediate each of said plurality of elongated dielectric support rods and disposed on the internal defining surface of said conductive shell surrounding said helix.

7. A high frequency electron discharge device having an elongated axis along which an electron beam travels in energy exchange relationship with an electromagnetic traveling wave over at least a portion of the axial extent of said device, said device including a beam forming and projecting means disposed at the upstream portion of said device, a slow wave interaction circuit disposed along the device axis downstream from said electron beam forming and projecting means, and an elongated conductive shell surrounding said slow wave circuit, the internal surface of said conductive shell being spaced from said slow wave circuit, said conductive shell including an axial portion so formed that the minimum spacing between said internal surface and said slow wave circuit is less than in the remaining portions of said conductive shell.

8. The device according to claim 7 wherein said internal surface within said axial portion includes azimuthally displaced axially elongated conductive ridge portions.

9. The device according to claim 8 wherein said ridge portions have thickness dimensions which are tapered in an axial direction.

10. A high frequency electron discharge device having an elongated axis along which an electron beam travels in energy exchange relationship with an electromagnetic traveling wave over at least a portion of the axial extent of said device, said device including a beam forming and projecting means disposed at the upstream portion of said device, a slow wave interaction circuit disposed along the device axis downstream from said electron beam forming and projecting means, and an elongated conductive shell surrounding said slow wave circuit, the internal surface of said conductive shell being spaced from said slow wave circuit, said conductive shell including an axial portion so formed that the maximum spacing between said internal surface and said flow wave circuit is greater than in the remaining portions of said conductive shell.

11. The device according to claim 10 wherein said internal surface within said axial portion includes azimuthally displaced axially elongated slot portions.

12. The device according to claim 11 wherein said slot portions have depth dimensions which are tapered in an axial direction.

13. A high frequency electron discharge device having an elongated axis along which an electron beam travels in energy exchange relationship with an electromagnetic traveling wave over at least a portion of the axial extent of said device, said device including a beam forming and projecting means disposed at the upstream portion of said device, a slow wave interaction circuit disposed along the device axis downstream from said electron beam forming and projecting means, and an elongated conductive shell surrounding said slow wave circuit, the internal surface of said conductive shell being spaced from said slow wave circuit, said conductive shell including an axial portion having an axially elongated land and groove pattern in the internal surface thereof, the remaining portions of said conductive shell having no such pattern.

14. The device according to claim 13 wherein the internal surface of said axial portion includes azimuthally spaced axially elongated conductive loading ridges.

15. The device according to claim 13 wherein the internal surface of said axial portion includes azimuthally spaced axially elongated slots.

References Cited

UNITED STATES PATENTS

| | | | |
|---|---|---|---|
| 2,771,565 | 11/1956 | Bryant et al. | 315—3.5 |
| 2,802,135 | 7/1957 | Dodds | 315—3.5 |
| 2,820,171 | 1/1958 | Lauer | 315—3.5 |
| 2,822,501 | 2/1958 | Poulter | 315—3.5 |
| 3,181,024 | 4/1965 | Sensider | 315—3.5 |
| 3,200,286 | 7/1965 | Rorden | 315—3.5 |
| 3,221,204 | 11/1965 | Hant et al. | 315—3.5 |

HERMAN KARL SAALBACH, *Primary Examiner.*

S. CHATMON, Jr., *Assistant Examiner.*